US012720383B2

(12) United States Patent
He et al.

(10) Patent No.: US 12,720,383 B2
(45) Date of Patent: Aug. 25, 2026

(54) ENHANCED MEASUREMENT OBJECT CONFIGURATIONS AND PROCEDURES

(71) Applicant: QUALCOMM Incorporated, San Diego, CA (US)

(72) Inventors: Linhai He, San Diego, CA (US); Masato Kitazoe, Hachiouji (JP); Ozcan Ozturk, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 261 days.

(21) Appl. No.: 18/307,755

(22) Filed: Apr. 26, 2023

(65) Prior Publication Data

US 2023/0354125 A1 Nov. 2, 2023

Related U.S. Application Data

(60) Provisional application No. 63/337,033, filed on Apr. 29, 2022.

(51) Int. Cl.
*H04W 36/00* (2009.01)
*H04W 36/06* (2009.01)
*H04W 72/0457* (2023.01)

(52) U.S. Cl.
CPC ....... *H04W 36/0085* (2018.08); *H04W 36/06* (2013.01); *H04W 72/0457* (2023.01)

(58) Field of Classification Search
None
See application file for complete search history.

(56) References Cited

U.S. PATENT DOCUMENTS

| | | | | |
|---|---|---|---|---|
| 12,490,127 B2* | 12/2025 | Islam | | H04L 5/0094 |
| 2020/0137599 A1* | 4/2020 | Yiu | | H04W 24/10 |
| 2022/0060923 A1 | 2/2022 | Zheng et al. | | |
| 2022/0394533 A1* | 12/2022 | Jin | | H04W 56/001 |
| 2023/0171658 A1* | 6/2023 | Wen | | H04L 5/0048 |
| 2023/0308914 A1* | 9/2023 | Islam | | H04W 24/08 |
| 2024/0147288 A1* | 5/2024 | Huang | | H04B 17/24 |

FOREIGN PATENT DOCUMENTS

| | | |
|---|---|---|
| WO | 2021028033 A1 | 2/2021 |
| WO | 2021190364 A1 | 9/2021 |
| WO | WO2023197804 * | 10/2023 |

OTHER PUBLICATIONS

International Search Report and Written Opinion—PCT/US2023/020241—ISA/EPO—Aug. 4, 2023.

(Continued)

*Primary Examiner* — Mohammad S Adhami
(74) *Attorney, Agent, or Firm* — Patterson & Sheridan, L.L.P.

(57) ABSTRACT

Certain aspects of the present disclosure provide techniques for wireless communication by a user equipment (UE), generally including receiving signaling configuring the UE with a first serving cell measurement object (MO) and a second serving cell MO, performing serving cell measurement according to the first serving cell MO, when operating in a first bandwidth part (BWP), performing a BWP switch from the first BWP to a second BWP, and performing serving cell measurement according to the second serving cell MO after the BWP switch.

27 Claims, 13 Drawing Sheets

(56) References Cited

OTHER PUBLICATIONS

Qualcomm Incorporated: "Measurement Object Configuration with NCD-SSB", 3GPP TSG-RAN WG2 Meeting #118-e, R2-2206033, 3rd Generation Partnership Project, Mobile Competence Centre, 650, Route Des Lucioles, F-06921 Sophia-Antipolis Cedex, France , vol. RAN WG2, No. Online, May 10, 2022-May 19, 2022, Apr. 26, 2022, 3 Pages, XP052142953, p. 1-p. 3.
Taiwan Search Report—TW112116000—TIPO—Jun. 20, 2026.

* cited by examiner

One Frame (TDD)
10 ms
400
subframe
RB
slot

D D D D D D D D D D D D X U
subcarrier
OFDM symbol
slot
DMRS Rx
CSI-RS
430
PDCCH
SSS
PSS
PDSCH
PBCH
20 RBs
SS/PBCH Block system bandwidth RBs
One Frame (TDD)
10 ms
450
subframe
RB
slot D X U U U U U U U U U U U U
subcarrier
OFDM symbol
slot
SRS
DMRS R
SRS Comb 0
SRS Comb 1
480
PUCCH
PUSCH

| Non-RedCap initial DL BWP | RedCap initial DL BWP | RedCap non-initial DL BWP |
|---|---|---|
| Contains SSB, RACH CSS & CORESET0 | Contains RACH CSS Does not contain SSB | May/may not contain SSB and system info |

FIG. 13

ENHANCED MEASUREMENT OBJECT CONFIGURATIONS AND PROCEDURES

CROSS-REFERENCE TO RELATED APPLICATIONS

This application claims benefit and priority to U.S. Provisional Application No. 63/337,033, filed Apr. 29, 2022, which is assigned to the assignee hereof and hereby expressly incorporated by reference in its entirety as if fully set forth below and for all applicable purposes.

BACKGROUND

Field of the Disclosure

Aspects of the present disclosure relate to wireless communications, and more particularly, to techniques for determining timelines for enhanced measurement object configurations and procedures.

Description of Related Art

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available wireless communication system resources with those users.

Although wireless communication systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communication systems, increasing the ability for different types of devices to intercommunicate, increasing the number and type of wireless communication mediums available for use, and the like. Consequently, there exists a need for further improvements in wireless communications systems to overcome the aforementioned technical challenges and others.

SUMMARY

One aspect provides a method for wireless communication by a user equipment (UE), including receiving signaling configuring the UE with a first serving cell measurement object (MO) and a second serving cell MO, performing serving cell measurement according to the first serving cell MO, when operating in a first bandwidth part (BWP), performing a BWP switch from the first BWP to a second BWP, and performing serving cell measurement according to the second serving cell MO after the BWP switch.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 13 depicts aspects of an example communications device.

DETAILED DESCRIPTION

Figure 1:
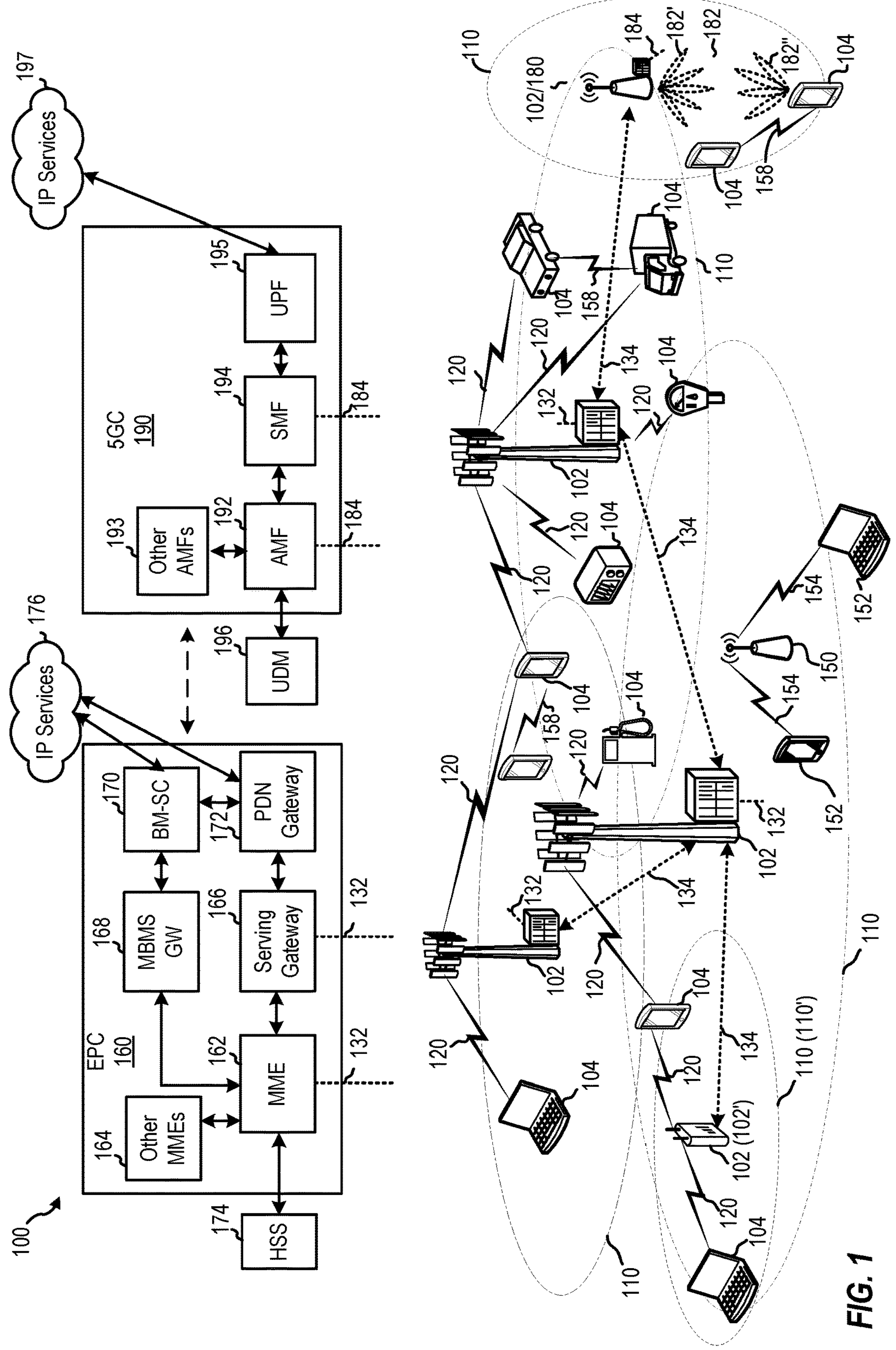
FIG. 1 depicts an example wireless communication network.

Aspects of the present disclosure provide apparatuses, methods, processing systems, and computer-readable mediums for an enhanced measurement object configuration and procedure.

Different types of UEs may have capabilities tailored to suit certain objectives. For example, some types of UEs may be designed to be scalable and deployable in a more efficient and cost-effective way than other types of UEs. These types of UEs may have reduced capabilities (RedCap) relative to conventional (more expensive) UEs, such as high-end smart phones. RedCap UEs may have relaxed latency and/or reliability requirements.

A network may configure separate frequency resources, referred to as bandwidth parts (BWPs) for RedCap UEs to perform certain functions, such as measurement procedures. In some cases, a network may configure a UE with one or more measurement objects (MOs) to perform radio resource management (RRM) measurements for various purposes, such as mobility (e.g., for the purpose of handover between cells). An MO indicates the frequency/time location and sub-carrier spacing (SCS) of reference signals to be measured. For example, an MO may contain a specific synchronization signal block (SSB) frequency and a set of cells associated with this SSB frequency for the UE to measure.

In some cases, a network may configure a UE with a serving cell MO that contains the frequency location of cell defining SSBs (CD-SSBs) of a serving cell. A serving cell MO is typically configured per UE, does not depend on a UE BWP, and is configured under a serving cell configuration information element (ServingCellConfig IE). A UE may be required to periodically perform RRM measurement on its serving cell and intra-frequency neighbor cells (neighbor cells that use same frequencies) based on what is configured in a serving cell MO.

RedCap UEs typically have a narrower maximum UE bandwidth (20 MHz) than other types of UEs. Because of their narrower BWP, their dedicated BWP may not be wide enough to include the CD-SSB of its serving cell. In that case, the network may configure a non-cell-defining SSB (NCD-SSB) in the dedicated BWP of the Redcap UE. This NCD-SSB can be used for a number of procedures, including RRM measurements, in the same way as CD-SSB.

There are potential issues with such a configuration. For example, if a RedCap UE has only NCD-SSB in its active BWP (and no CD-SSB), the network may have to configure a measurement gap (MG) for those measurements. This means the UE would have to switch its BWP to the location where CD-SSB is contained in order to perform the required serving cell measurements. This MG and the associated BWP switch introduce overhead and may significantly reduce UE throughput.

Aspects of the present disclosure may help address this potential issue by making the serving cell MO per BWP instead of per cell. Using this approach, a UE may be configured with multiple serving cell MOs. Utilizing this approach, the network may not need to reconfigure the UE serving cell MO when the UE switches to a BWP with a different SSB. As a result, the techniques presented herein may help the UE avoid measurement gaps or frequent RRC reconfigurations, which may reduce signaling overhead and increase UE throughput.

Introduction to Wireless Communication Networks

The techniques and methods described herein may be used for various wireless communications networks. While aspects may be described herein using terminology commonly associated with 3G, 4G, and/or 5G wireless technologies, aspects of the present disclosure may likewise be applicable to other communication systems and standards not explicitly mentioned herein.

FIG. 1 depicts an example of a wireless communication network 100, in which aspects described herein may be implemented. For example, UEs 104 of the wireless communication network 100 may be configured, by network entities such as base stations 102, with different measurement objects (MOs) for performing cell measurements on different bandwidth parts (BWPs).

Generally, wireless communication network 100 includes various network entities (alternatively, network elements or network nodes). A network entity is generally a communications device and/or a communication function performed by a communications device. For example, various functions of a network as well as various devices associated with and interacting with a network may be considered network entities.

In the depicted example, wireless communication network 100 includes base stations (BSs) 102, user equipments (UEs) 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with UEs 104 via communications links 120. The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and others. Each of BSs 102 may provide communication coverage for a respective geographic coverage area 110, which may sometimes be referred to as a cell, and which may overlap in some cases (e.g., small cell 102' may have a coverage area 110' that overlaps the coverage area 110 of a macro cell). ABS may, for example, provide communication coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
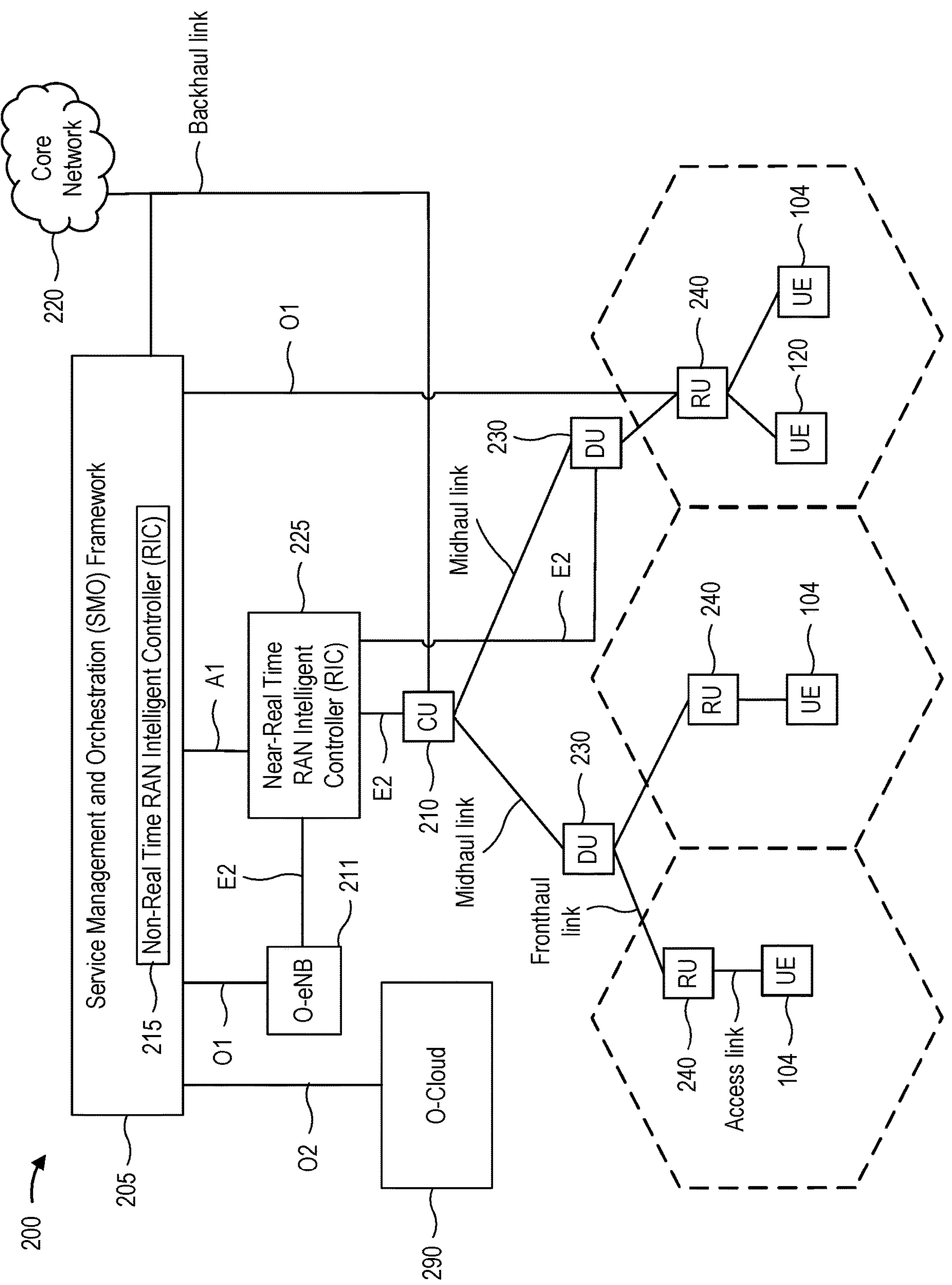
FIG. 2 depicts an example disaggregated base station architecture.

While BSs 102 are depicted in various aspects as unitary communications devices, BSs 102 may be implemented in various configurations. For example, one or more components of base station may be disaggregated, including a central unit (CU), one or more distributed units (DUs), one or more radio units (RUs), a radio unit (RU), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communication network 100 may also be configured to support different radio access technologies, such as 3G, 4G, and 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communication network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as “Sub-6 GHz”. Similarly, 3GPP currently defines Frequency Range 2 (FR2) as including 26-41 GHz, which is sometimes referred to (interchangeably) as a “millimeter wave” (“mmW” or “mmWave”). A base station configured to communicate using mmWave/near mmWave radio frequency bands (e.g., a mmWave base station such as BS 180) may utilize beamforming (e.g., 182) with a UE (e.g., 104) to improve path loss and range.

The communication links 120 between BSs 102 and, for example, UEs 104, may be through one or more carriers, which may have different bandwidths (e.g., 5, 10, 15, 20, 100, 400, and other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". BS 180 may also receive the beamformed signal from UE 104 in one or more receive directions 182'. Base station 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communication network 100 further includes a Wi-Fi AP 150 in communication with Wi-Fi stations (STAs) 152 via communication links 154 in, for example, a 2.4 GHz and/or 5 GHz unlicensed frequency spectrum.

Certain UEs 104 may communicate with each other using device-to-device (D2D) communication link 158. D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172 in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, an integrated access and backhaul (IAB) node, a relay node, a sidelink node, to name a few examples. Tie invention to figure.

FIG. 2 depicts an example disaggregated base station 200 architecture, in which in which aspects described herein may be implemented. For example, one or more of the entities shown in FIG. 2 may configure a UE with different MOs for performing cell measurements on different BWPs.

The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework

205 (such as reconfiguration via 01) or via creation of RAN management policies (such as A1 policies).

Figure 3:
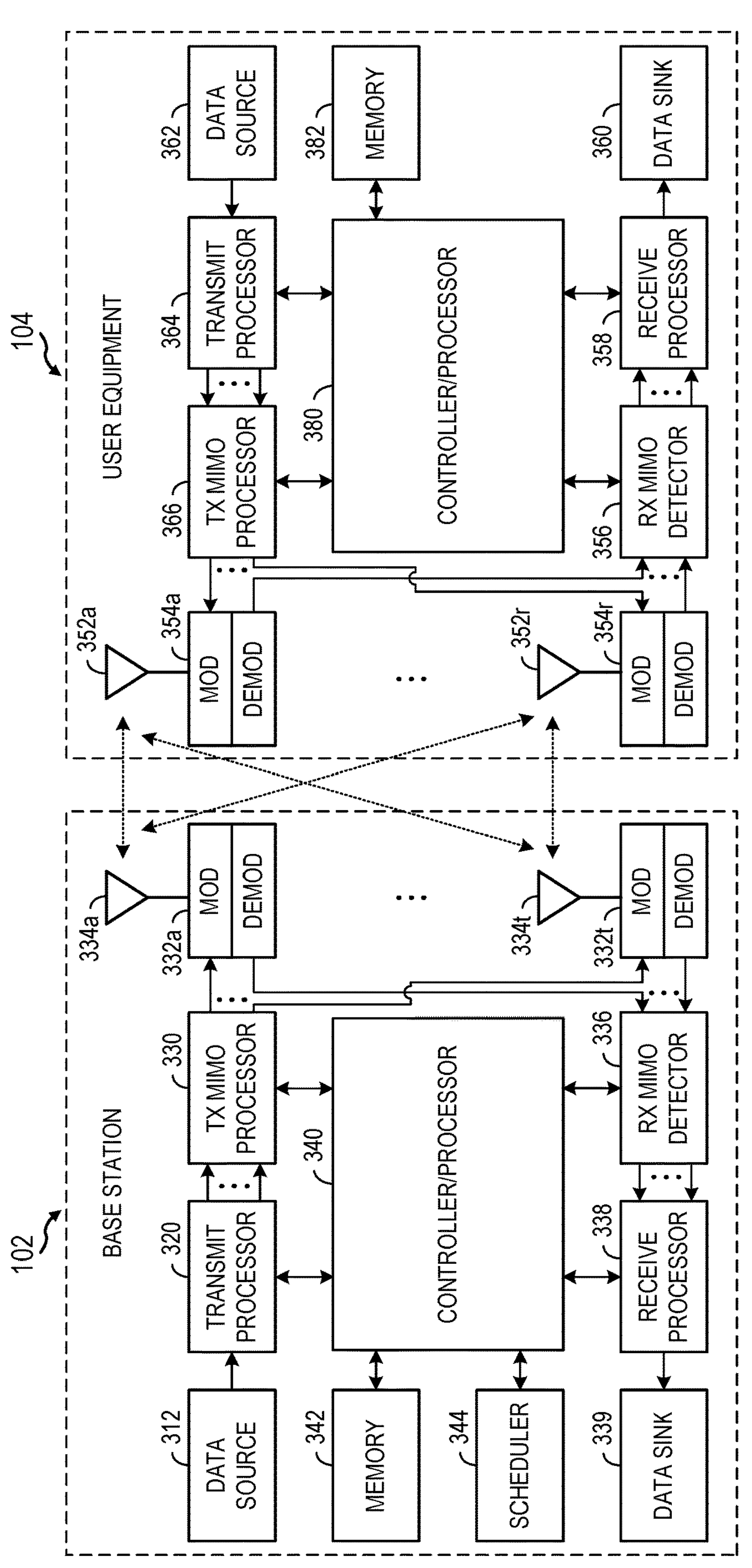
FIG. 3 depicts aspects of an example base station and an example user equipment.

FIG. 3 depicts aspects of an example BS 102 and a UE 104, which may implement certain aspects of the present disclosure. For example, the UE 104 may be configured, by the BS 102 with different MOs for performing cell measurements on different BWPs.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., data source 362) and wireless reception of data (e.g., data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communication network, such as wireless communication network 100 of FIG. 1.

Figures 4A, 4B, 4C, 4D:
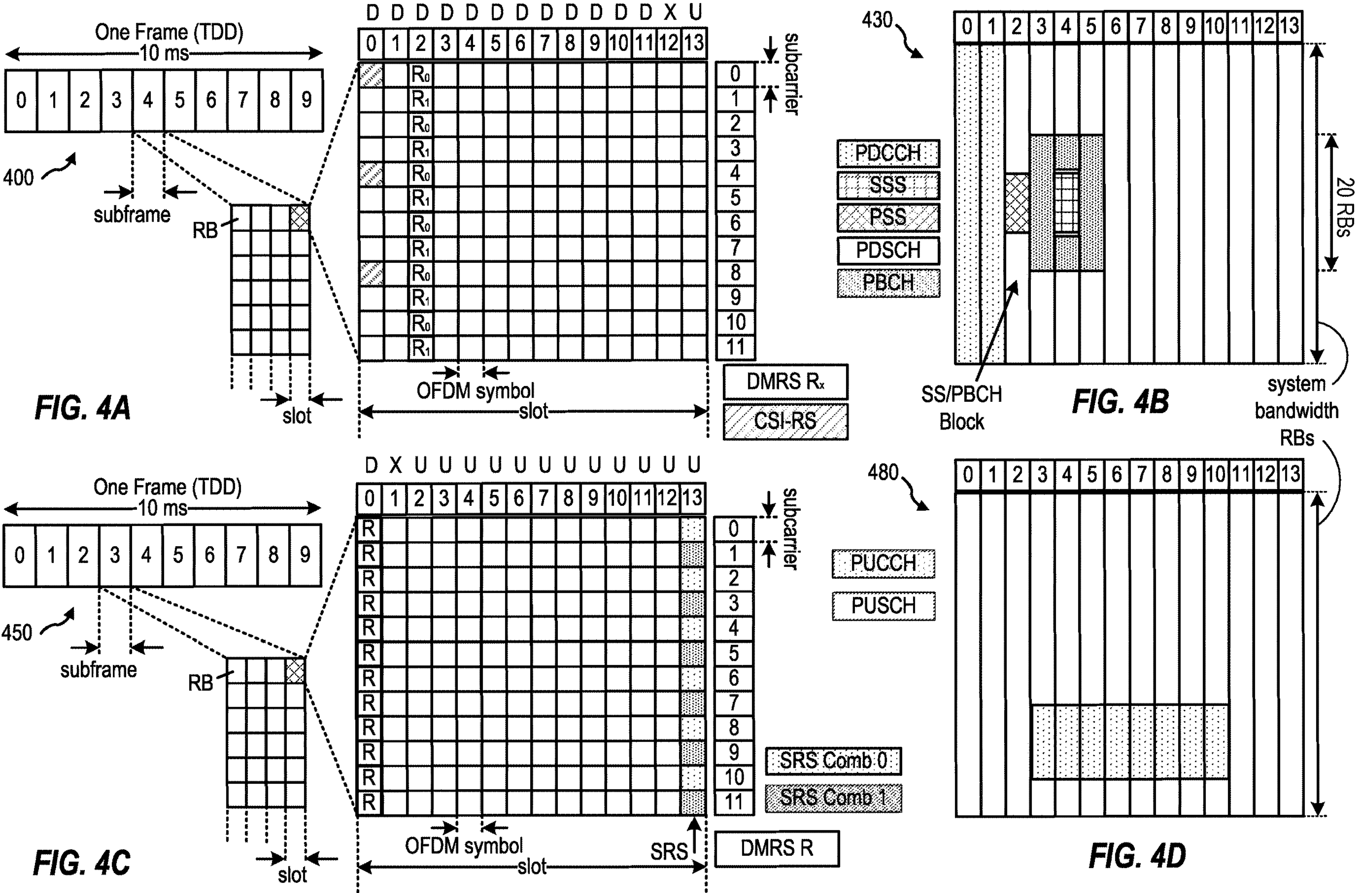
FIGS. 4A, 4B, 4C, and 4D depict various example aspects of data structures for a wireless communication network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communication systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and in the time domain with SC-FDM.

A wireless communication frame structure may be frequency division duplex (FDD), in which for a particular set of subcarriers and subframes within the set of subcarriers are dedicated for either DL or UL. Wireless communication frame structures may also be time division duplex (TDD), in which for a particular set of subcarriers and subframes within the set of subcarriers are dedicated for both DL and UL.

In FIGS. 4A and 4C, the wireless communication frame structure is TDD where D is DL, U is UL, and X is flexible for use between DL/UL. UEs may be configured with the slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot configuration. Subframes may also include mini-slots, which generally have fewer symbols than an entire slot. Other wireless communication technologies may have a different frame structure and/or different channels.

Generally, the number of slots within a subframe is based on a slot configuration and a numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}\times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and channel state information reference signals (CSI-RS) for channel estimation at the UE. The RS may also include beam measurement RS (BRS), beam refinement RS (BRRS), and phase tracking RS (PT-RS).

FIG. 4B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may also transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Reduced Capability (RedCap) UE

Various technologies may be the focus of current wireless communication standards. For example, 5G NR Release 15 and/or 16 (Rel-15 and/or Rel-16 for short) may focus on premium smartphones (e.g., enhanced mobile broadband (eMBB)), and other verticals such as ultra-reliable low latency communication (URLLC) and/or vehicle-to-everything (V2X) communications. In some wireless communication standards (e.g., 5G NR Rel-17 and beyond) there may exist a strong desire for new radio (NR) to be scalable and deployable in a more efficient and cost-effective way. Thus, a new UE type with reduced capabilities (RedCap) has been introduced.

A RedCap UE may exhibit a relaxation of peak throughput (e.g., 20 MHz), as well as lower latency and/or reliability requirements. Also, the RedCap UE may involve lower device cost (and complexity) and improved efficiency (e.g. power consumption, system overhead, and cost improvements) as compared to high-end devices, such as high-end eMBB and URLCC devices of 5G NR Rel-15/16 (e.g., high-end smartphones). In some cases, a cell may allow access for a RedCap UE. A network can configure a separate initial UL BWP for RedCap UEs in a system information block (SIB) which may be used both during and after initial access. A RedCap UE may not be configured to support a BWP wider than the maximum bandwidth of the initial BWP for the RedCap UE; however, a non-RedCap UE, which may share an initial UL BWP with the RedCap UE, is allowed to exceed the maximum bandwidth of the initial BWP. The RedCap UE may switch to a non-initial BWP by using the BWP switching mechanisms as described in greater detail below.

For many use cases, a RedCap UE may be implemented with a device design having a more compact form factor. RedCap UEs may also support frequency range (FR) 1 and/or 2 bands for frequency division duplexed (FDD) and/or time division duplexed (TDD) communications. For F1, a basic BWP operation with restriction may be used as a starting point for RedCap UE capability. Alternatively, basic BWP operation without restriction may be used as a starting point for RedCap UE capability. For FR1 in TDD, center frequencies may be the same for the initial DL and UL BWPs used during random access for RedCap UEs. Center frequencies may be the same for a non-initial DL and UL BWPs with the same BWP identifier (BWP ID) for a RedCap UE.

Thus, some design objectives a RedCap UE may include scalable resource allocation, coverage enhancement for DL and/or UL, power saving in all RRC states, and/or co-existence with the NR premium UE.

Figure 5:
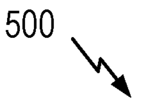
FIG. 5 depicts an example new radio (NR) reduced capability (RedCap) user equipment (UE).
Figure 5:
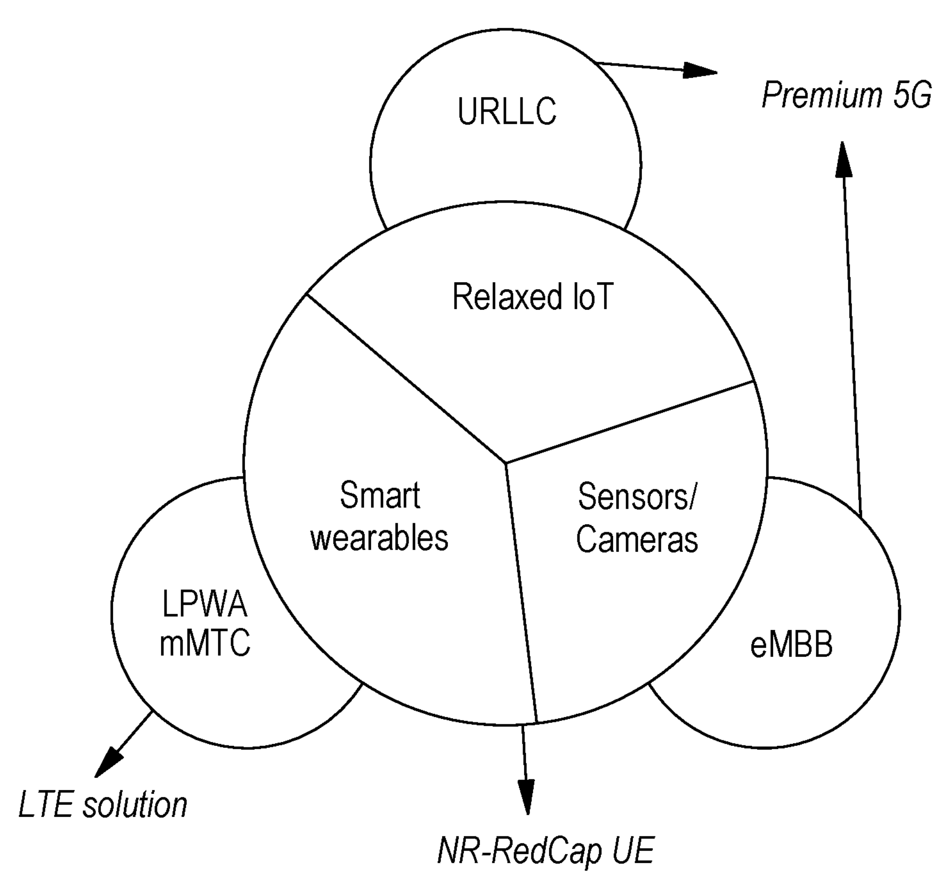

As shown in diagram 500 of FIG. 5, an NR-RedCap UE may be a smart wearable device, a sensor/camera, or any other device configured for relaxed internet-of-things (IoT) communications. Further, a RedCap UE functionality and/or capability may overlap with those of long term evolution (LTE) and/or fifth generation (5G) devices (e.g., premium 5G devices). For example, the functionality of relaxed IoT devices may overlap with that of URLLC devices, the functionality of smart wearable devices may overlap with that of low power wide area (LPWA) massive machine type communication (mMTC) devices, and/or the functionality of sensors/cameras may overlap with that of eMBB devices.

Overview of Dedicated RedCap BWPs

Figure 6:
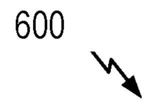
FIG. 6 illustrates example features for RedCap and non-RedCap bandwidth parts (BWPs).

Due to differences in capability, RedCap UEs (due to their low bandwidth capability) and conventional (e.g., non-RedCap or Legacy) UEs may be configured to operate in bandwidth parts (BWPs) with different features. The table 600 in FIG. 6 summarizes some of the different features. For example, a conventional, non-RedCap initial downlink (DL) BWP may contain SSBs, RACH common search space (CSS) and CORESET0.

As illustrated in FIG. 6, a RedCap initial DL BWP may contain, for example, the RACH CSS, but may not contain SSBs, CORESETs (e.g., CORESET0, CORESET for paging), and/or system information blocks (SIB). In other cases, a RedCap UE may not contain the RACH CSS, but may contain CORESETs (e.g., CORESET0). Similarly, the RedCap non-initial DL BWP may not contain SSB or system information, and may be unable to access this information.

Figure 7A:
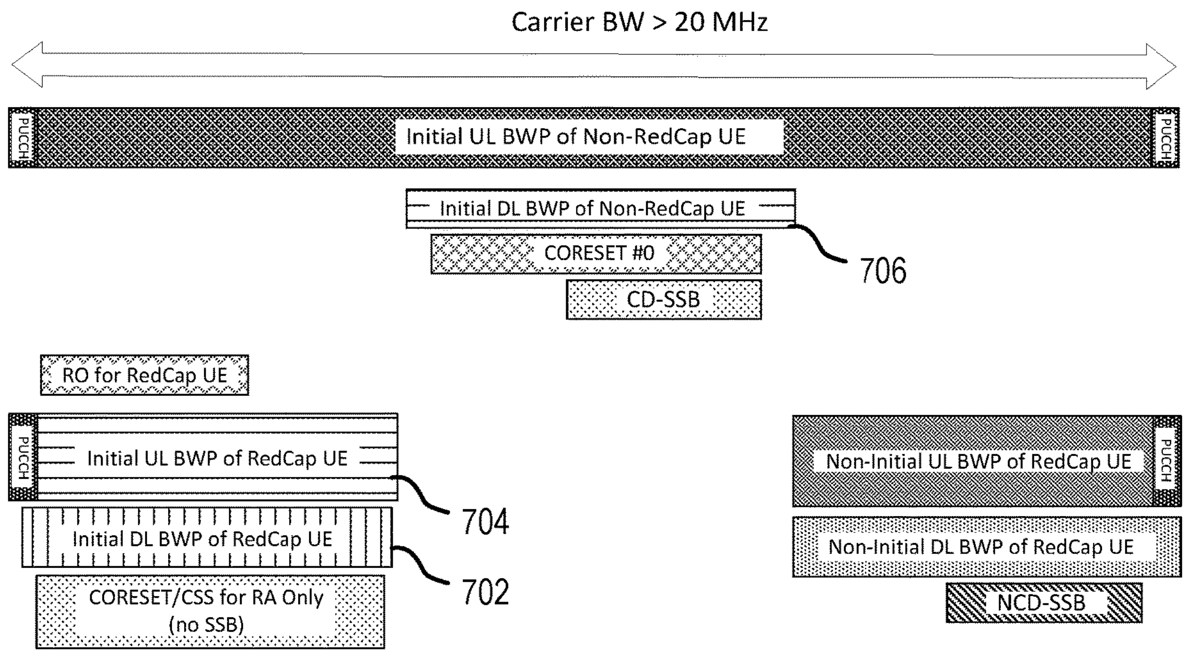
FIG. 7A and FIG. 7B depict example bandwidth part (BWP) configurations for RedCap and non-RedCap UEs, in accordance with aspects of the present disclosure.
Figure 7B:
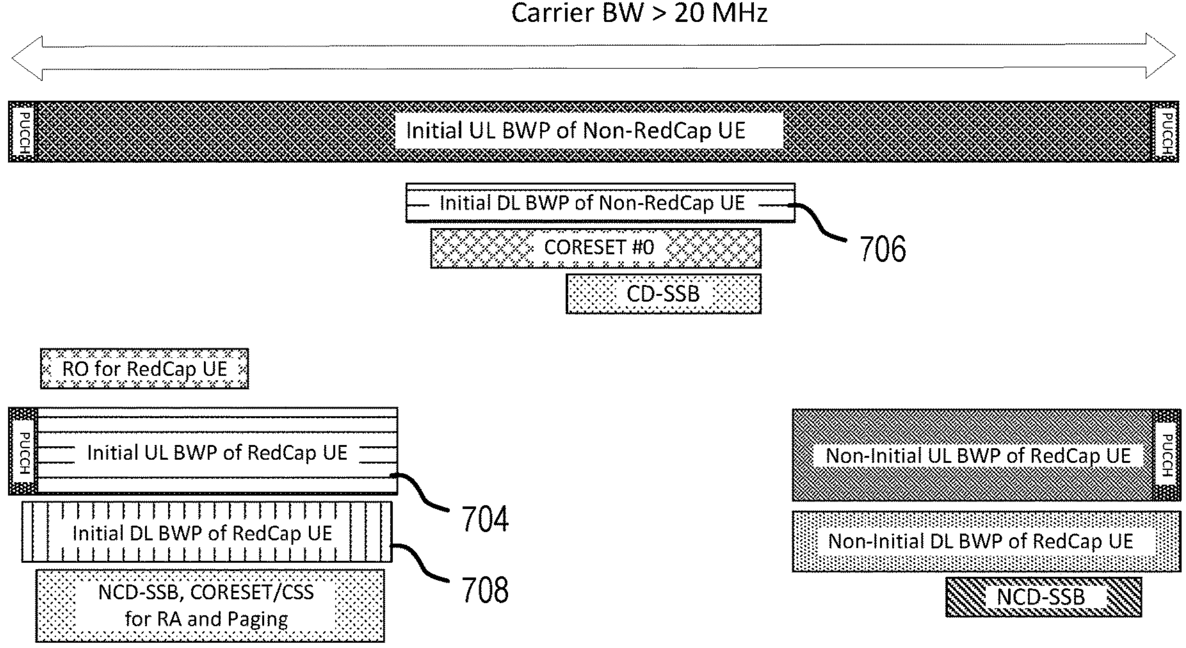

As illustrated in FIGS. 7A and 7B, a RedCap specific initial downlink (DL) BWP 702 and uplink (UL) BWP 704 may be configured. Certain standard specifications may allow for up to one separate initial UL BWP for RedCap to be configured. For a cell that allows access to a RedCap UE, the network can configure a separate initial DL BWP for RedCap UEs (this configuration may be via SIB, separate from the MIB configured CORESET #0 BWP).

As illustrated in FIG. 7A, in FR1, a separate initial DL BWP may be configured that does not include cell defining SSBs (CD-SSB) and does not contain the entire CORESET #0. In the illustrated example, the initial DL BWP is configured for random access but not for paging in idle/inactive mode. In this case, the RedCap UE does not expect the initial DL BWP to contain SSB/CORESET #0/SIB.

In general, it may be assumed that a RedCap UE performing random access in the separate DL BWP does not need to monitor paging in a BWP 706 containing CORESET #0. On the other hand, as illustrated in FIG. 7B, if the initial DL BWP 708 is configured for paging (and random access), the RedCap UE may expect the initial DL BWP to contain non cell-defining SSBs (NCD-SSBs) for the serving cell, but not CORESET #0/SIB.

Aspects Related to Enhanced Measurement Object Configurations and Procedures

Aspects of the present disclosure provide apparatuses, methods, processing systems, and computer-readable mediums for an enhanced measurement object (MO) configuration and procedure.

As noted above, a network may configure separate BWPs for RedCap UEs to perform certain functions, such as measurement procedures. In some cases, a network may configure a UE with one or more measurement objects (MOs) to perform radio resource management (RRM) measurements. In some cases, a network may configure a UE with a serving cell MO that contains the frequency location of cell defining SSBs (CD-SSBs) of a serving cell.

A serving cell MO is typically configured per UE, does not depend on a UE BWP, and is configured under a serving cell configuration information element (ServingCellConfig IE). A UE may be required to periodically perform RRM measurement on its serving cell and intra-frequency neighbor cells (neighbor cells that use same frequencies) based on what is configured in a serving cell MO.

A network may configure an MO on a NCD-SSB frequency if it wants the UE to use it only for serving cell measurements when some neighbor cells do not send an SSB on the UE's NCD-SSB frequency. For neighbor cell measurements, it may be up to network to configure an MO on CD-SSB or NCD-SSB or both. Aspects of the present disclosure propose configuring MOs for RedCap UEs to perform RRM measurements properly and efficiently. Such configuration may be particular effective when NCD-SSBs are used.

In current systems, a serving cell MO may configured under a serving cell configuration information element (ServingCellConfig IE). Thus, a serving cell MO is typically configured per cell, not per BWP.

In some cases, it is possible that for a RedCap UE, one of its dedicated BWP includes only NCD-SSB (and not CD-SSB) and another BWP includes only CD-SSB (and not NCD-SSB). Since only one serving cell MO is typically allowed to be configured, a current configuration framework may result in a UE having to measure the same serving cell MO, even after it switches to a BWP which does not contain the SSB in that MO. This result is less than ideal, as a UE would have to rely on a measurement gap to perform serving cell measurements.

Alternatively, the network may reconfigure (via RRC signaling) the serving cell MO to include the SSB contained in the new BWP. This approach also has potential issues. For example, this reconfiguration may have to be performed whenever UE switches to a different BWP. This creates overhead in signaling and delay in starting new serving cell measurements. For these reasons, a network may have to either reconfigure the serving cell MO or configure measurement gaps for serving cell measurements after a BWP switch, if the source and target BWPs are configured with different SSBs. Reconfiguration and measurement gaps both introduce latency that may adversely impact system performance.

Aspects of the present disclosure provide a potential solution to this issue by effectively making a serving cell MO configuration per BWP instead of per cell. In some cases, this solution may be implemented with relatively minimal impact on a current signaling framework. For example, the impact may be limited if a current serving cell MO is maintained under a serving cell configuration (ServingCellConfig), because this may be defined based on any SSB as it is now. This type of serving Cell MO may be referred to herein as a default serving Cell MO.

According to certain aspects, the network may optionally configure another serving Cell MO, for example, under a BWP-DedicatedDownlink for a BWP. This serving Cell MO may be defined based on the SSB configured in the associated BWP. This MO may be referred to as a dedicated serving Cell MO for the associated BWP.

In some cases, of a UE operates in a dedicated BWP which is configured with a dedicated serving Cell MO, that UE may perform its serving cell measurements based on the SSB included in this dedicated serving Cell MO, rather than the default serving cell MO. Otherwise, the UE may perform its serving cell measurements according to the default serving Cell MO.

With the enhancements proposed herein, the network may not need to reconfigure a UE serving Cell MO when UE switches to a BWP with a different SSB. Thus, this approach may help a UE avoid measurement gaps or frequent RRC reconfiguration.

Figure 8:
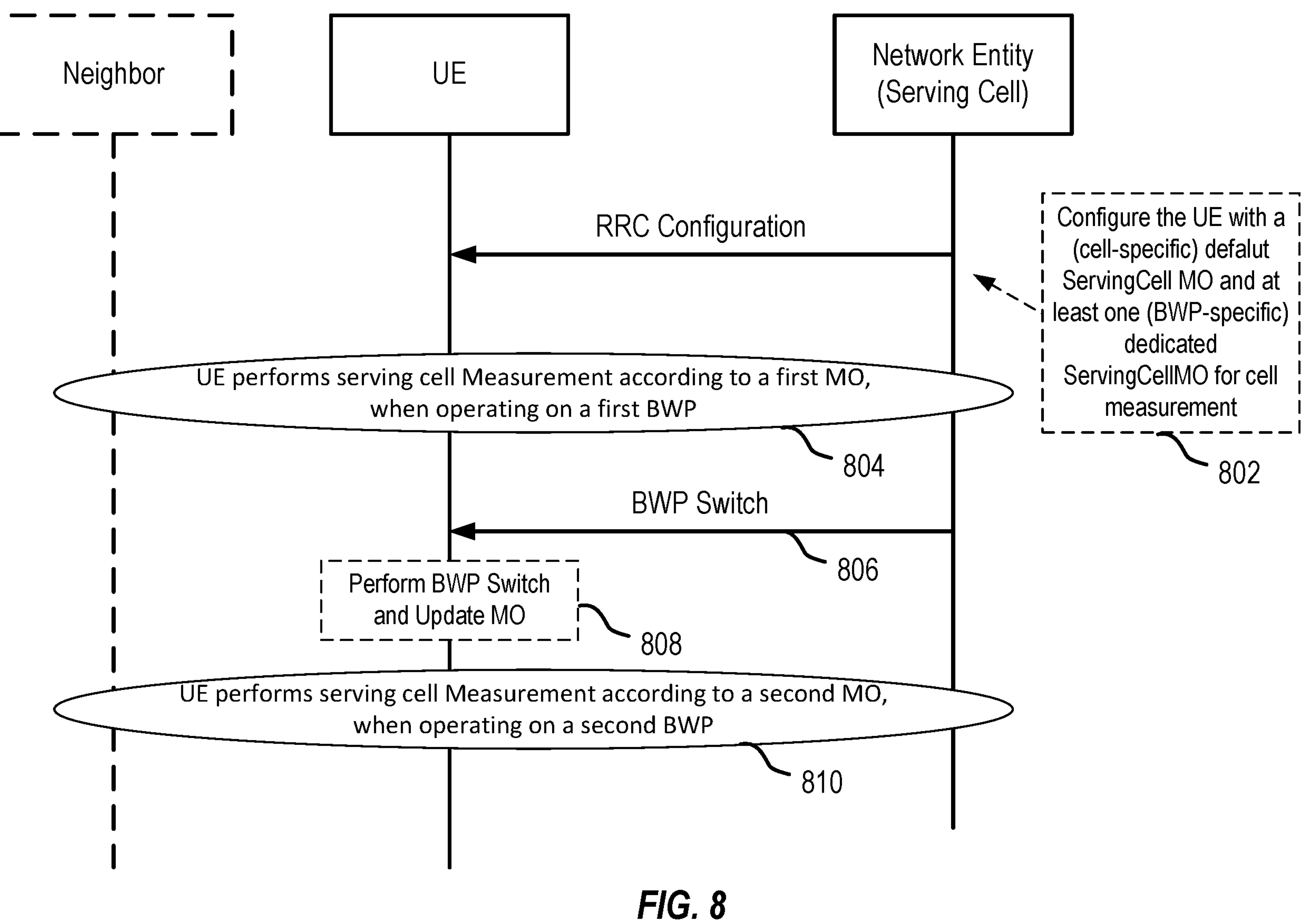
FIG. 8 depicts a call flow diagram for an enhanced measurement object configuration and procedure, in accordance with aspects of the present disclosure.

The techniques proposed herein may be understood with reference to the example call flow diagram 800 of FIG. 8. In some aspects, the network entity shown in FIG. 8 may be an example of the BS depicted and described with respect to FIGS. 1 and 3 or a disaggregated base station (or component thereof) depicted and described with respect to FIG. 2. Similarly, the UE shown in FIG. 8 may be an example of UE 104 depicted and described with respect to FIGS. 1 and 3.

The network may configure the UE with a first serving cell measurement object (MO) and a second serving cell MO. For example, as shown at 802, the serving cell may configure the UE, via RRC signaling, with a (cell-specific) default serving cell MO and at least one (BWP-specific) dedicated serving cell MO for cell measurement.

As shown at 804, the UE may perform serving cell measurement according to the first serving cell MO, when operating in a first bandwidth part (BWP). As shown at 806, the network may signal a BWP switch. In response, at 808, the UE may perform the BWP switch and update the MO. The UE may then perform cell measurement according to the second serving cell MO after the BWP switch, as shown at 810.

In some cases, the network may configure a BWP-specific serving cell MO under a BWP-DownlinkDedicated IE, if the corresponding BWP contains an SSB different from the one in the default serving cell MO configured under the ServingCellConfig IE.

In some cases, when a UE is in a BWP that is configured with a dedicated servingCellMO, the UE may perform its serving cell measurements according to the dedicated servingCellMO, instead of the default servingCellMO configured under ServingCellConfig IE.

Since intra-frequency and inter-frequency measurements are typically defined with respect to a serving cell MO of a UE, additional signaling may be needed for the UE to update its MOs related to neighbor cell measurements, when the UE changes its servingCellMO.

Such signaling is illustrated in the example scenarios shown in FIGS. 9A-9B and FIGS. 10A-10B. The examples may assume a UE is configured with two dedicated BWPs, BWP #1 and BWP #2, which contain CD-SSB and NCD-SSB, respectively. The default servingCellMO of the UE may be defined on CD-SSB (MO #1), which contains BWP #1. BWP #2, which contains NCD-SSB, may be configured with a dedicated servingCellMO (MO #2). The MOs in the examples may be used to detect a mobility event referred to as A3. Event A3 is triggered when a neighbor cell becomes better than another cell (e.g., a serving cell) by an offset value.

Figures 9A, 9B:
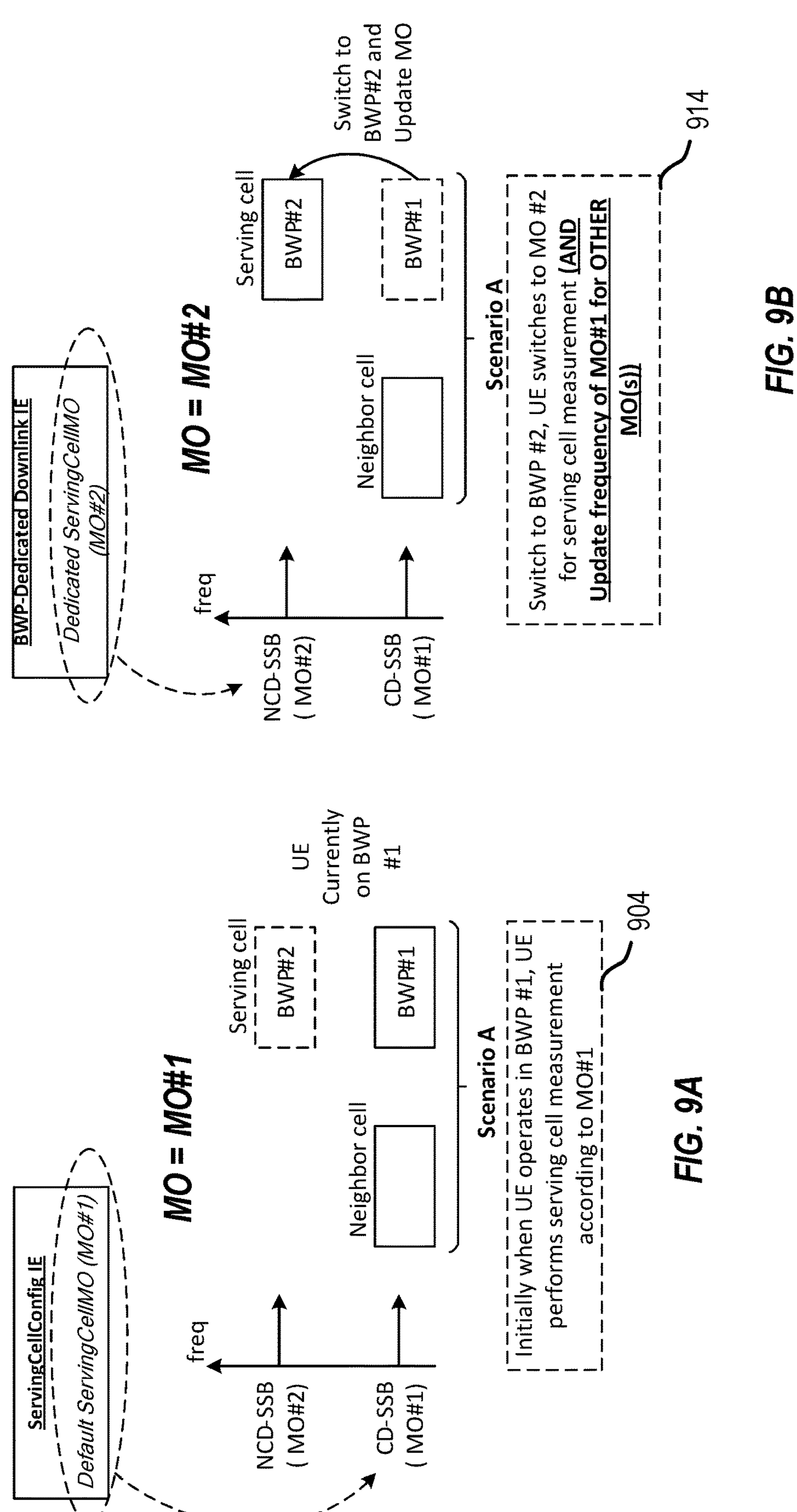
FIGS. 9A and 9B illustrate an example scenario for an enhanced measurement object configuration and procedure, in accordance with aspects of the present disclosure.

In the scenario shown in FIG. 9A, Scenario A, a UE neighbor cell is on the same frequency as the UE's CD-SSB (BWP #1). As shown at 904, when the UE initially operates on BWP #1, MO #1 is sufficient for neighbor cell measurements required by event A3.

As shown in FIG. 9B, the UE may switch from BWP #1 to BWP #2. As a result, as shown at 914, the UE switches the dedicated servingCellMO configured for BWP #2 (MO #2). However, the UE's neighbor cell measurements are still based on MO #1. As a result, the network may need a way to signal the UE to change those measurements to NCD-SSB. For example, the UE may update the (measurement) frequency of MO #1 for other MOs.

Figures 10A, 10B:
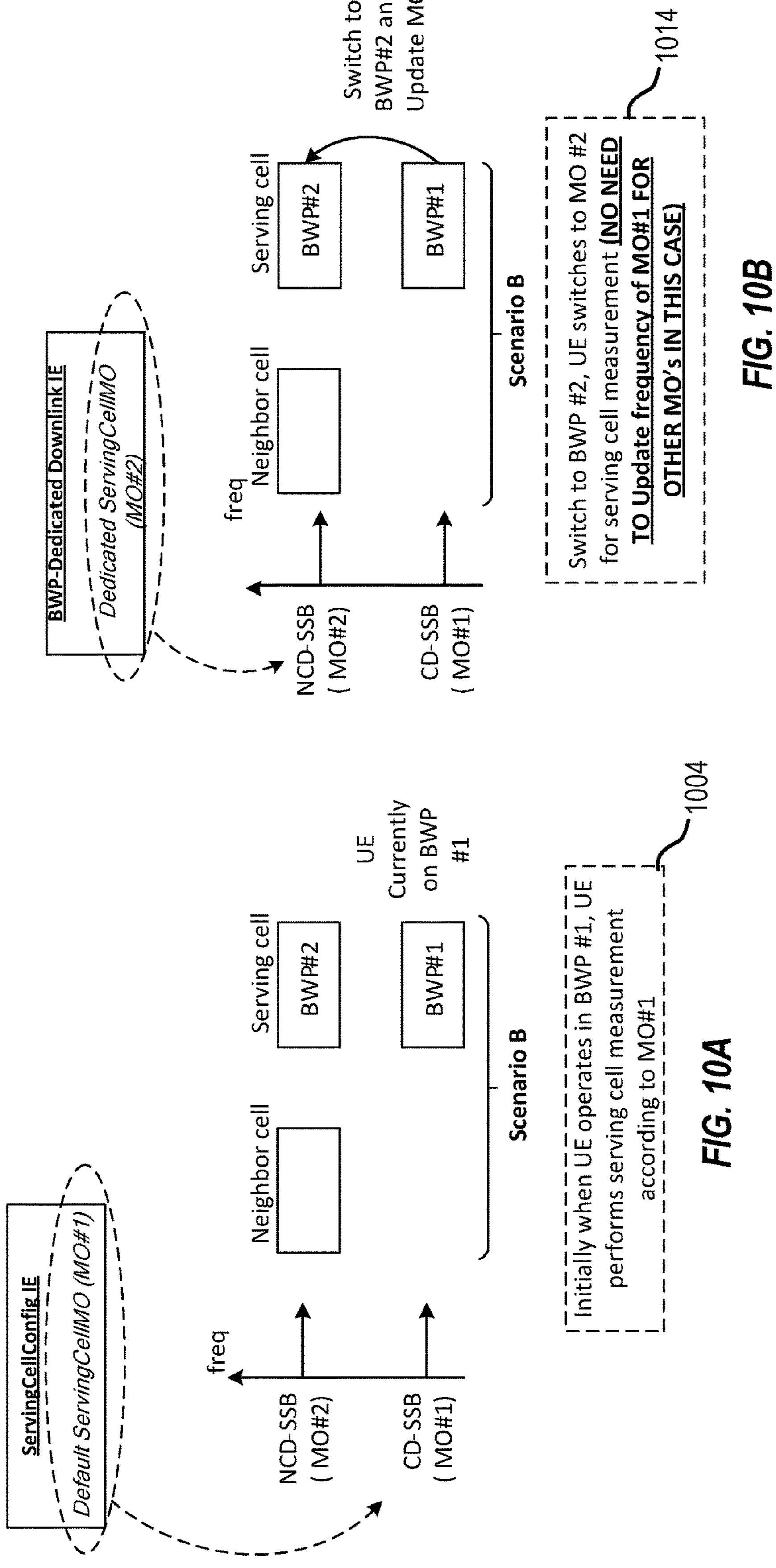
FIGS. 10A and 10B illustrate an example scenario for an enhanced measurement object configuration and procedure, in accordance with aspects of the present disclosure.

In the scenario shown in FIG. 10A, Scenario B, the UE's neighbor cell is on the same frequency as the UE's NCD-SSB. Thus, the network may configure MO #2 for UE's neighbor cell measurements. As shown at 1004, when the UE initially operates in BWP #1, the UE may perform serving cell measurement according to MO #1.

As shown at 1014 of FIG. 10B, when the UE switches from BWP #1 to BWP #2, the UE may switch from the default servingCellMO (MO #1) to the dedicated servingCellMO (i.e. MO #2). When the UE is in BWP #2, since neighbor cells are searched and measured on the same frequency as the serving cell measurement (MO #2), there may be no change necessary (e.g., no need to update the frequency of MO #1 for other MOs in this case).

Through the above examples, it can be seen that, in addition to the servingCellMO, some MOs may also be updated together with the UE's BWP switch, in order to continue proper neighbor cell measurements.

In some cases, the selection of such MOs may be determined by network. In this case, the signaling can be done in the same manner as the one for servingCellMO (e.g., under BWP-DownlinkDedicated IE), where the network can configure the MO(s) whose frequency(s) should be changed to the same frequency of the servingCellMO in this BWP (if configured).

Referring to Scenario A, shown in FIGS. 9A and 9B, the network could configure a measurement object (MO #1)

under the BWP-DownlinkDedicated IE of BWP #2. In some cases, the presence of this configuration (e.g., via a MeasObjectNR-r17, MO #1), may indicate to the UE that when the UE operates in BWP #2, all intra-frequency neighbor cell measurements should be performed on the same frequency as the current servingCellMO (which is NCD-SSB). But such a configuration (of MeasObjectNR-r17) may not be needed for BWP #1, because when UE operates in BWP #1, all intra-frequency neighbor cell measurements (e.g., MO #1) are already on the same frequency as the servingCellMO of BWP #1 (CD-SSB).

Referring to Scenario B, shown in FIGS. 10A and 10B, the network may configure a MeasObjectNR-r17(MO #2) under the BWP-DownlinkDedicated IE of BWP #1. The presence of this configuration, MeasObjectNR-r17(MO #2), may indicate to the UE that, when the UE operates in BWP #2, all intra-frequency neighbor cell measurements may be performed on the same frequency as the current servingCellMO (which is NCD-SSB). But such a configuration of MeasObjectNR-r17 may not be needed for BWP #2, because when the UE operates in BWP #2, all intra-frequency neighbor cell measurements (i.e. MO #2) may already be on the same frequency as the servingCellMO of BWP #2 (i.e. NCD-SSB).

According to certain aspects, if a UE's active DL BWP is configured with a BWP-specific servingCellMO, the network may also include in the BWP-DownlinkDedicated IE the measurement object(s) whose frequency(s) should be changed to the frequency of the servingCellMO in this BWP.

As described above, according to aspects of the present disclosure, the network may optionally configure a BWP-specific servingCellMO under BWP-DownlinkDedicated IE, if this BWP contains a SSB different from the one in the default servingCellMO under ServingCellConfig IE. In some cases, when a UE is in a BWP which is configured with a dedicated servingCellMO, that UE may perform its serving cell measurements according to the dedicated servingCellMO, instead of the default servingCellMO configured under ServingCellConfig IE.

In addition to a servingCellMO, some other MOs may also need to be updated together with UE's BWP switch, in order to continue proper neighbor cell measurements. In some cases, if a UE's active DL BWP is configured with a BWP-specific servingCellMO, the network may include, in the BWP-DownlinkDedicated IE, the measurement object (s) whose frequency(s) should be changed to the frequency of the servingCellMO in this BWP.

Using the techniques proposed herein, a UE may be configured with multiple serving cell MOs. Utilizing this approach, the network may not need to reconfigure the UE serving cell MO when the UE switches to a BWP with a different SSB. As a result, the techniques presented herein may help the UE avoid measurement gaps or frequent RRC reconfigurations, which may reduce signaling overhead and increase UE throughput.

Example Operations

Figure 11:
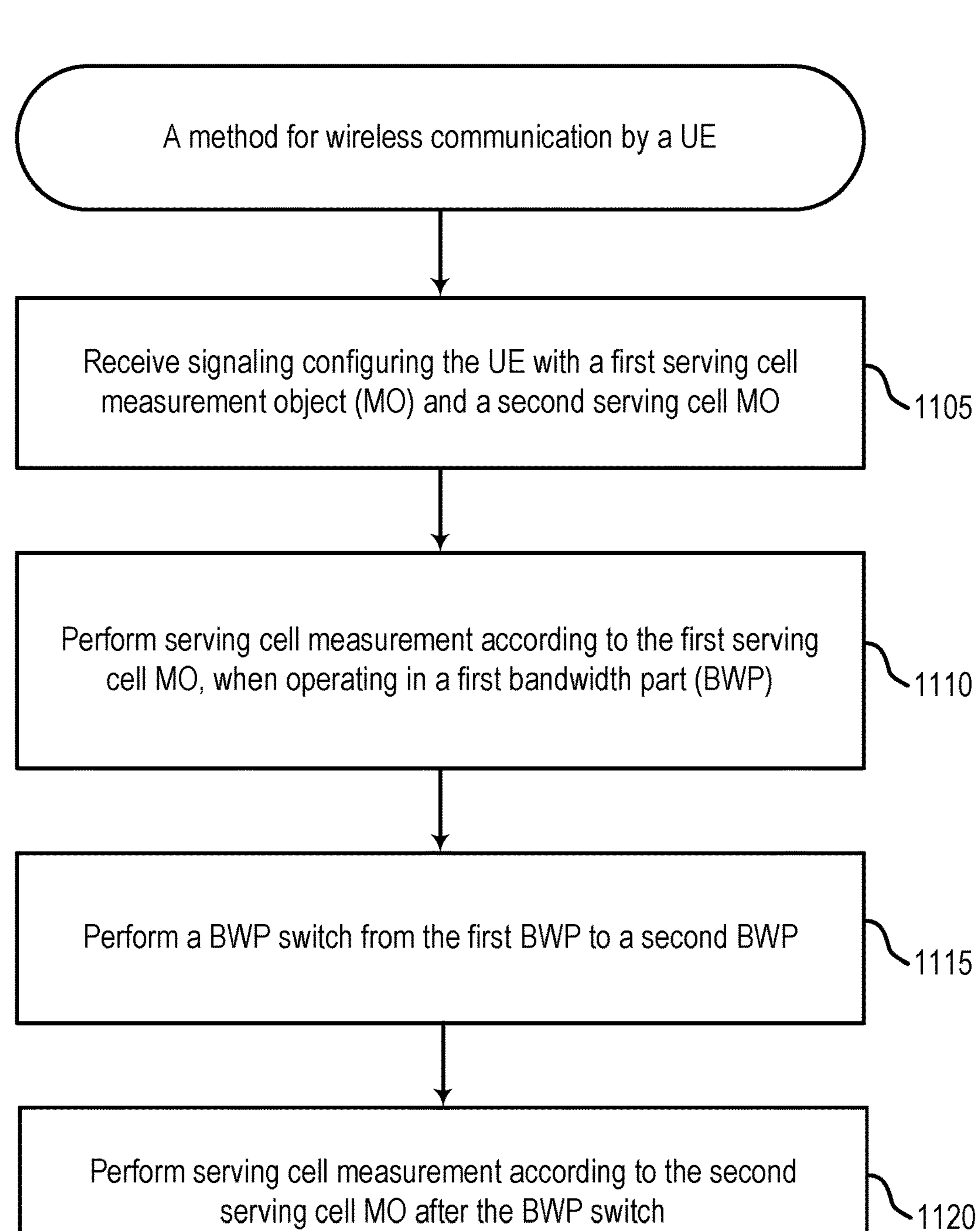
FIG. 11 depicts a method for wireless communication.

FIG. 11 shows an example of a method 1100 of wireless communication by a user equipment (UE), such as a UE 104 of FIGS. 1 and 3. Method 1100 begins at step 1105 with receiving signaling configuring the UE with a first serving cell measurement object (MO) and a second serving cell MO. In some cases, the operations of this step refer to, or may be performed by, circuitry for receiving and/or code for receiving as described with reference to FIG. 13.

Method 1100 then proceeds to step 1110 with performing serving cell measurement according to the first serving cell MO, when operating in a first bandwidth part (BWP). In some cases, the operations of this step refer to, or may be performed by, circuitry for performing and/or code for performing as described with reference to FIG. 13.

Method 1100 then proceeds to step 1115 with performing a BWP switch from the first BWP to a second BWP. In some cases, the operations of this step refer to, or may be performed by, circuitry for performing and/or code for performing as described with reference to FIG. 13.

Method 1100 then proceeds to step 1120 with performing serving cell measurement according to the second serving cell MO after the BWP switch. In some cases, the operations of this step refer to, or may be performed by, circuitry for performing and/or code for performing as described with reference to FIG. 13.

In some aspects, the second serving cell MO comprises a BWP-specific serving cell MO.

In some aspects, the signaling configuring the UE with the second serving cell MO comprises a BWP dedicated downlink information element (IE).

In some aspects, the first serving cell MO comprises a cell-specific serving cell MO.

In some aspects, the signaling configuring the UE with the first serving cell MO comprises a serving cell configuration information element (IE).

In some aspects, the first BWP is configured for cell defining (CD) synchronization signal blocks (SSBs); and the second BWP is configured for non-cell defining (NCD) synchronization signal blocks (SSBs).

In some aspects, the method 1100 further includes updating an MO for another type of measurement, after performing another measurement according to the first serving cell MO, after the BWP switch. In some cases, the operations of this step refer to, or may be performed by, circuitry for updating and/or code for updating as described with reference to FIG. 13.

In some aspects, updating the MO for the other type of measurement comprises updating a frequency on which the other type of measurement is taken.

In some aspects, the UE updates the MO for the other type of measurement based on the signaling configuring the UE with the second serving cell MO.

In some aspects, the signaling configuring the UE with the second serving cell MO comprises a BWP dedicated downlink information element (IE) for the second BWP; and the BWP dedicated downlink IE for the second BWP includes an indication of an identifier for the MO for the other type of measurement.

Figure 13:
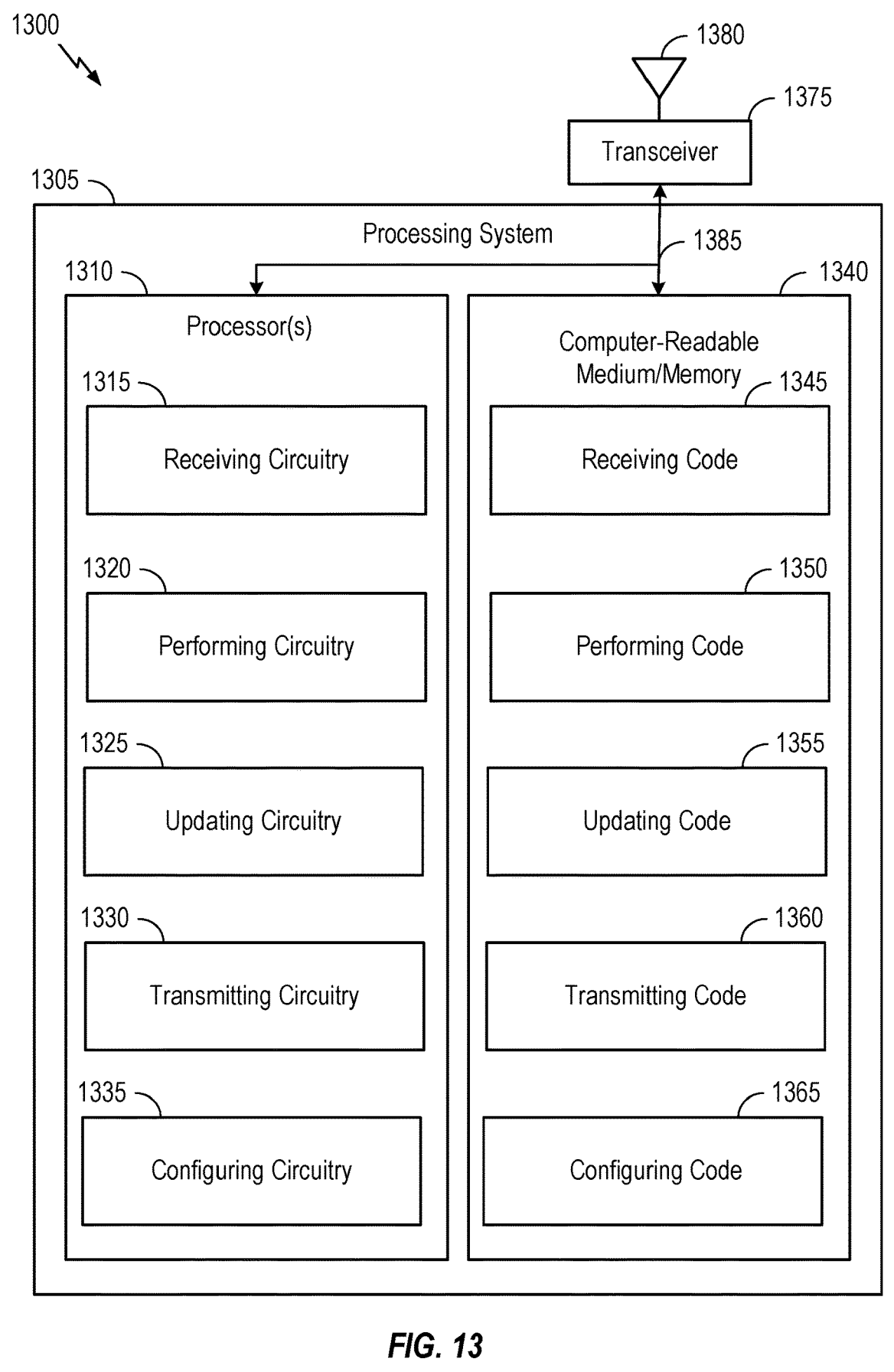

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

Figure 12:
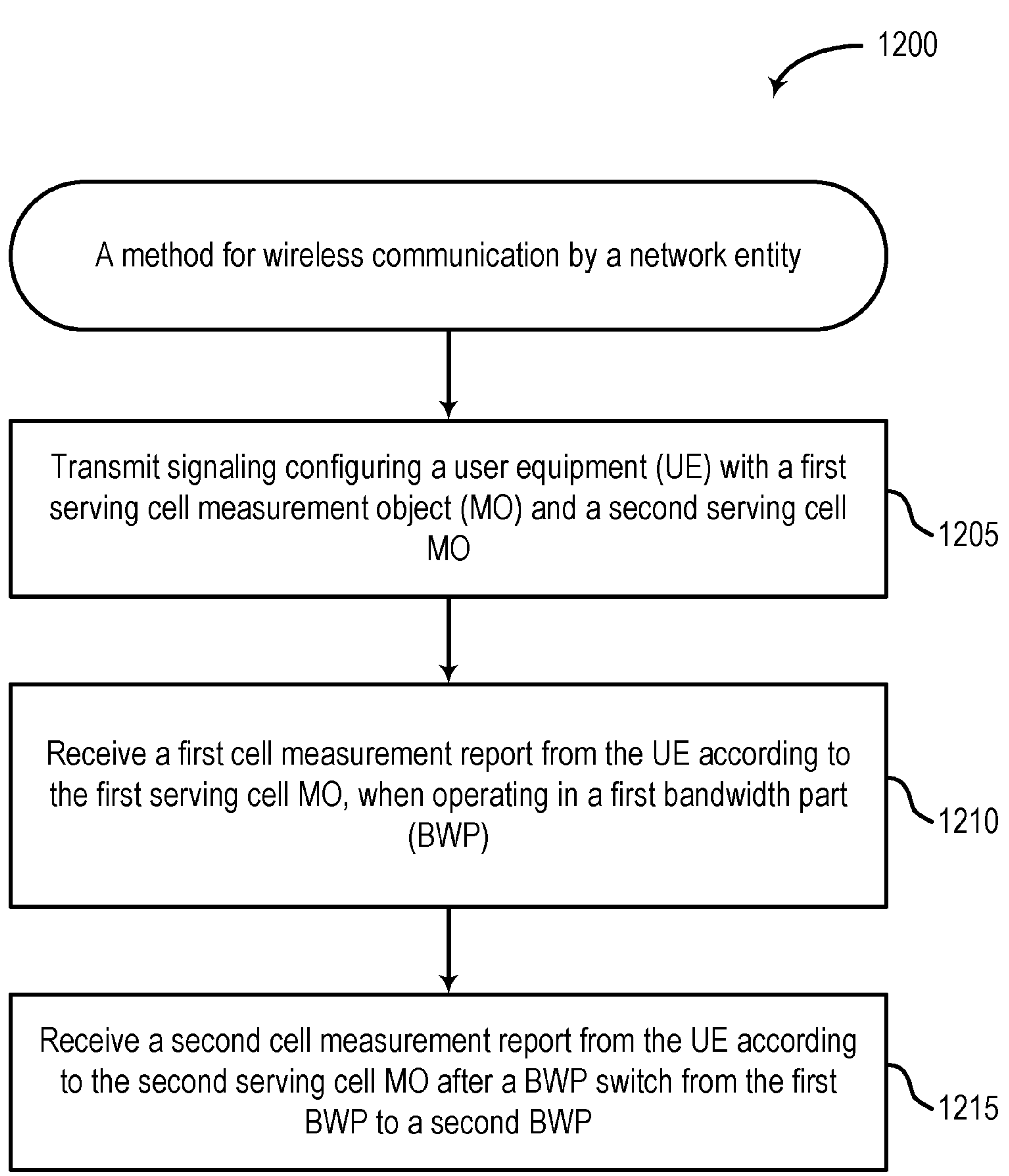
FIG. 12 depicts a method for wireless communication.

FIG. 12 shows an example of a method 1200 of wireless communication by a network entity, such as a BS 102 of FIGS. 1 and 3, or a disaggregated base station as discussed with respect to FIG. 2.

Method 1200 begins at step 1205 with transmitting signaling configuring a user equipment (UE) with a first serving cell measurement object (MO) and a second serving cell MO. In some cases, the operations of this step refer to, or may be performed by, circuitry for transmitting and/or code for transmitting as described with reference to FIG. 13.

Method 1200 then proceeds to step 1210 with receiving a first cell measurement report from the UE according to the first serving cell MO, when operating in a first bandwidth part (BWP). In some cases, the operations of this step refer to, or may be performed by, circuitry for receiving and/or code for receiving as described with reference to FIG. 13.

Method 1200 then proceeds to step 1215 with receiving a second cell measurement report from the UE according to the second serving cell MO after a BWP switch from the first BWP to a second BWP. In some cases, the operations of this step refer to, or may be performed by, circuitry for receiving and/or code for receiving as described with reference to FIG. 13.

In some aspects, the second serving cell MO comprises a BWP-specific serving cell MO.

In some aspects, the signaling configuring the UE with the second serving cell MO comprises a BWP dedicated downlink information element (IE).

In some aspects, the first serving cell MO comprises a cell-specific serving cell MO.

In some aspects, the signaling configuring the UE with the first serving cell MO comprises a serving cell configuration information element (IE).

In some aspects, the first BWP is configured for cell defining (CD) synchronization signal blocks (SSBs); and the second BWP is configured for non-cell defining (NCD) synchronization signal blocks (SSBs).

In some aspects, the method 1200 further includes configuring the UE to update an MO for another type of measurement after the BWP switch. In some cases, the operations of this step refer to, or may be performed by, circuitry for configuring and/or code for configuring as described with reference to FIG. 13.

In some aspects, the method 1200 further includes receiving another report, based on the MO for another type of measurement, updated after the BWP switch. In some cases, the operations of this step refer to, or may be performed by, circuitry for receiving and/or code for receiving as described with reference to FIG. 13.

In some aspects, the signaling configuring the UE with the second serving cell MO indicates the UE should update a frequency on which the other type of measurement is taken, after the BWP switch.

In some aspects, the signaling configuring the UE with the second serving cell MO also configures the UE to update an MO for another type of measurement after the BWP switch.

In some aspects, the signaling configuring the UE with the second serving cell MO comprises a BWP dedicated downlink information element (IE) for the second BWP; and the BWP dedicated downlink IE for the second BWP includes an indication of an identifier for the MO for the other type of measurement.

In one aspect, method 1200, or any aspect related to it, may be performed by an apparatus, such as communications device 1300 of FIG. 13, which includes various components operable, configured, or adapted to perform the method 1200. Communications device 1300 is described below in further detail.

Note that FIG. 12 is just one example of a method, and other methods including fewer, additional, or alternative steps are possible consistent with this disclosure.

Example Communications Device(s)

FIG. 13 depicts aspects of an example communications device 1300. In some aspects, communications device 1300 is a user equipment, such as UE 104 described above with respect to FIGS. 1 and 3. In some aspects, communications device 1300 is a network entity, such as BS 102 of FIGS. 1 and 3, or a disaggregated base station as discussed with respect to FIG. 2.

The communications device 1300 includes a processing system 1305 coupled to the transceiver 1375 (e.g., a transmitter and/or a receiver). In some aspects (e.g., when communications device 1300 is a network entity), processing system 1305 may be coupled to a network interface 1385 that is configured to obtain and send signals for the communications device 1300 via communication link(s), such as a backhaul link, midhaul link, and/or fronthaul link as described herein, such as with respect to FIG. 2. The transceiver 1375 is configured to transmit and receive signals for the communications device 1300 via the antenna 1380, such as the various signals as described herein. The processing system 1305 may be configured to perform processing functions for the communications device 1300, including processing signals received and/or to be transmitted by the communications device 1300.

The processing system 1305 includes one or more processors 1310. In various aspects, the one or more processors 1310 may be representative of one or more of receive processor 358, transmit processor 364, TX MIMO processor 366, and/or controller/processor 380, as described with respect to FIG. 3. In various aspects, one or more processors 1310 may be representative of one or more of receive processor 338, transmit processor 320, TX MIMO processor 330, and/or controller/processor 340, as described with respect to FIG. 3. The one or more processors 1310 are coupled to a computer-readable medium/memory 1340 via a bus 1370. In certain aspects, the computer-readable medium/memory 1340 is configured to store instructions (e.g., computer-executable code) that when executed by the one or more processors 1310, cause the one or more processors 1310 to perform the method 1100 described with respect to FIG. 11, or any aspect related to it; and the method 1200 described with respect to FIG. 12, or any aspect related to it. Note that reference to a processor performing a function of communications device 1300 may include one or more processors 1310 performing that function of communications device 1300.

In the depicted example, computer-readable medium/memory 1340 stores code (e.g., executable instructions), such as code for receiving 1345, code for performing 1350, code for updating 1355, code for transmitting 1360, and code for configuring 1365. Processing of the code for receiving 1345, code for performing 1350, code for updating 1355, code for transmitting 1360, and code for configuring 1365 may cause the communications device 1300 to perform the method 1100 described with respect to FIG. 11, or any aspect related to it; and the method 1200 described with respect to FIG. 12, or any aspect related to it.

The one or more processors 1310 include circuitry configured to implement (e.g., execute) the code stored in the computer-readable medium/memory 1340, including circuitry for receiving 1315, circuitry for performing 1320, circuitry for updating 1325, circuitry for transmitting 1330, and circuitry for configuring 1335. Processing with circuitry for receiving 1315, circuitry for performing 1320, circuitry for updating 1325, circuitry for transmitting 1330, and circuitry for configuring 1335 may cause the communications device 1300 to perform the method 1100 described with respect to FIG. 11, or any aspect related to it; and the method 1200 described with respect to FIG. 12, or any aspect related to it.

Various components of the communications device 1300 may provide means for performing the method 1100 described with respect to FIG. 11, or any aspect related to it; and the method 1200 described with respect to FIG. 12, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1375 and the antenna 1380 of the communications device 1300 in FIG. 13. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1375 and the antenna 1380 of the communications device 1300 in FIG. 13.

EXAMPLE CLAUSES

Implementation examples are described in the following numbered clauses:

Clause 1: A method for wireless communication by a user equipment (UE), comprising: receiving signaling configuring the UE with a first serving cell measurement object (MO) and a second serving cell MO; performing serving cell measurement according to the first serving cell MO, when operating in a first bandwidth part (BWP); performing a BWP switch from the first BWP to a second BWP; and performing serving cell measurement according to the second serving cell MO after the BWP switch.

Clause 2: The method of Clause 1, wherein the second serving cell MO comprises a BWP-specific serving cell MO.

Clause 3: The method of Clause 2, wherein the signaling configuring the UE with the second serving cell MO comprises a BWP dedicated downlink information element (IE).

Clause 4: The method of Clause 3, wherein the first serving cell MO comprises a cell-specific serving cell MO.

Clause 5: The method of Clause 4, wherein the signaling configuring the UE with the first serving cell MO comprises a serving cell configuration information element (IE).

Clause 6: The method of any one of Clauses 1-5, wherein: the first BWP is configured for cell defining (CD) synchronization signal blocks (SSBs); and the second BWP is configured for non-cell defining (NCD) synchronization signal blocks (SSBs).

Clause 7: The method of any one of Clauses 1-6, further comprising: updating an MO for another type of measurement, after performing another measurement according to the first serving cell MO, after the BWP switch.

Clause 8: The method of Clause 7, wherein updating the MO for the other type of measurement comprises updating a frequency on which the other type of measurement is taken.

Clause 9: The method of Clause 8, wherein the UE updates the MO for the other type of measurement based on the signaling configuring the UE with the second serving cell MO.

Clause 10: The method of Clause 9, wherein: the signaling configuring the UE with the second serving cell MO comprises a BWP dedicated downlink information element (IE) for the second BWP; and the BWP dedicated downlink IE for the second BWP includes an indication of an identifier for the MO for the other type of measurement.

Clause 11: A method for wireless communication by a network entity, comprising: transmitting signaling configuring a user equipment (UE) with a first serving cell measurement object (MO) and a second serving cell MO; receiving a first cell measurement report from the UE according to the first serving cell MO, when operating in a first bandwidth part (BWP); and receiving a second cell measurement report from the UE according to the second serving cell MO after a BWP switch from the first BWP to a second BWP.

Clause 12: The method of Clause 11, wherein the second serving cell MO comprises a BWP-specific serving cell MO.

Clause 13: The method of Clause 12, wherein the signaling configuring the UE with the second serving cell MO comprises a BWP dedicated downlink information element (IE).

Clause 14: The method of Clause 13, wherein the first serving cell MO comprises a cell-specific serving cell MO.

Clause 15: The method of Clause 14, wherein the signaling configuring the UE with the first serving cell MO comprises a serving cell configuration information element (IE).

Clause 16: The method of any one of Clauses 11-15, wherein: the first BWP is configured for cell defining (CD) synchronization signal blocks (SSBs); and the second BWP is configured for non-cell defining (NCD) synchronization signal blocks (SSBs).

Clause 17: The method of any one of Clauses 11-16, further comprising: configuring the UE to update an MO for another type of measurement after the BWP switch; and receiving another report, based on the MO for another type of measurement, updated after the BWP switch.

Clause 18: The method of Clause 17, wherein the signaling configuring the UE with the second serving cell MO indicates the UE should update a frequency on which the other type of measurement is taken, after the BWP switch.

Clause 19: The method of Clause 18, wherein the signaling configuring the UE with the second serving cell MO also configures the UE to update an MO for another type of measurement after the BWP switch.

Clause 20: The method of Clause 19, wherein: the signaling configuring the UE with the second serving cell MO comprises a BWP dedicated downlink information element (IE) for the second BWP; and the BWP dedicated downlink IE for the second BWP includes an indication of an identifier for the MO for the other type of measurement.

Clause 21: An apparatus, comprising: a memory comprising executable instructions; and a processor configured to execute the executable instructions and cause the apparatus to perform a method in accordance with any one of Clauses 1-20.

Clause 22: An apparatus, comprising means for performing a method in accordance with any one of Clauses 1-20.

Clause 23: A non-transitory computer-readable medium comprising executable instructions that, when executed by a processor of an apparatus, cause the apparatus to perform a method in accordance with any one of Clauses 1-20.

Clause 24: A computer program product embodied on a computer-readable storage medium comprising code for performing a method in accordance with any one of Clauses 1-20.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications at a user equipment (UE), comprising: at least one memory comprising instructions and one or more processors, individually or collectively, configured to execute the instructions and cause the apparatus to:

receive signaling configuring the UE with a first serving cell measurement object (MO) and a second serving cell MO;

perform serving cell measurement according to the first serving cell MO, when operating in a first bandwidth part (BWP);

perform a BWP switch from the first BWP to a second BWP;

update a neighbor cell MO, after the BWP switch, wherein the update comprises an update of a frequency of the neighbor cell MO to match a frequency of the second serving cell MO, and the update is based on the signaling configuring the UE with the second serving cell MO; and perform serving cell measurement according to the second serving cell MO after the BWP switch.

2. The apparatus of claim 1, wherein the second serving cell MO comprises a BWP-specific serving cell MO.

3. The apparatus of claim 2, wherein the signaling configuring the UE with the second serving cell MO comprises a BWP dedicated downlink information element (IE).

4. The apparatus of claim 3, wherein the first serving cell MO comprises a cell-specific serving cell MO.

5. The apparatus of claim 4, wherein the signaling configuring the UE with the first serving cell MO comprises a serving cell configuration information element (IE).

6. The apparatus of claim 1, wherein:

the first BWP is configured for cell defining (CD) synchronization signal blocks (SSBs); and the second BWP is configured for non-cell defining (NCD) synchronization signal blocks (SSBs).

7. The apparatus of claim 1, wherein the update occurs after performing another measurement according to the first serving cell MO.

8. The apparatus of claim 7, wherein the update of the neighbor cell MO comprises an update of a frequency on which neighbor cell measurement is taken.

9. The apparatus of claim 8, wherein:

the signaling configuring the UE with the second serving cell MO comprises a BWP dedicated downlink information element (IE) for the second BWP; and the BWP dedicated downlink IE for the second BWP includes an indication of an identifier for the neighbor cell MO.

10. An apparatus for wireless communications at a network entity, comprising:

at least one memory comprising instructions; and one or more processors, individually or collectively, configured to execute the instructions and cause the apparatus to:

transmit signaling configuring a user equipment (UE) with a first serving cell measurement object (MO) and a second serving cell MO;

receive a first cell measurement report from the UE according to the first serving cell MO, when operating in a first bandwidth part (BWP);

configure the UE, via the signaling configuring the UE with the second serving cell MO, to update a neighbor cell MO after a BWP switch from the first BWP to a second BWP, wherein the update comprises an update of a frequency of the neighbor cell MO to match a frequency of the second serving cell MO; and receive a second cell measurement report from the UE according to the second serving cell MO after the BWP switch.

11. The apparatus of claim 10, wherein the second serving cell MO comprises a BWP-specific serving cell MO.

12. The apparatus of claim 11, wherein the signaling configuring the UE with the second serving cell MO comprises a BWP dedicated downlink information element (IE).

13. The apparatus of claim 12, wherein the first serving cell MO comprises a cell-specific serving cell MO.

14. The apparatus of claim 13, wherein the signaling configuring the UE with the first serving cell MO comprises a serving cell configuration information element (IE).

15. The apparatus of claim 10, wherein:

the first BWP is configured for cell defining (CD) synchronization signal blocks (SSBs); and the second BWP is configured for non-cell defining (NCD) synchronization signal blocks (SSBs).

16. The apparatus of claim 10, wherein the one or more processors, individually or collectively, are further configured to cause the apparatus to:

receive another report, based on the neighbor cell MO, updated after the BWP switch.

17. The apparatus of claim 16, wherein the signaling configuring the UE with the second serving cell MO indicates the UE should update a frequency on which neighbor cell measurement is taken, after the BWP switch.

18. The apparatus of claim 17, wherein:

the signaling configuring the UE with the second serving cell MO comprises a BWP dedicated downlink information element (IE) for the second BWP; and the BWP dedicated downlink IE for the second BWP includes an indication of an identifier for the neighbor cell MO.

19. A method for wireless communications at a user equipment (UE), comprising:

receiving signaling configuring the UE with a first serving cell measurement object (MO) and a second serving cell MO;

performing serving cell measurement according to the first serving cell MO, when operating in a first bandwidth part (BWP);

performing a BWP switch from the first BWP to a second BWP;

updating a neighbor cell MO, after the BWP switch, wherein the update comprises updating a frequency of the neighbor cell MO to match a frequency of the second serving cell MO, and the update is based on the signaling configuring the UE with the second serving cell MO; and performing serving cell measurement according to the second serving cell MO after the BWP switch.

20. The method of claim 19, wherein the second serving cell MO comprises a BWP-specific serving cell MO.

21. The method of claim 20, wherein the signaling configuring the UE with the second serving cell MO comprises a BWP dedicated downlink information element (IE).

22. The method of claim 21, wherein the first serving cell MO comprises a cell-specific serving cell MO.

23. The method of claim 22, wherein the signaling configuring the UE with the first serving cell MO comprises a serving cell configuration information element (IE).

24. The method of claim 19, wherein:

the first BWP is configured for cell defining (CD) synchronization signal blocks (SSBs); and the second BWP is configured for non-cell defining (NCD) synchronization signal blocks (SSBs).

25. The method of claim 19, wherein the updating occurs after performing another measurement according to the first serving cell MO.

26. The method of claim 25, wherein updating the neighbor cell MO comprises updating a frequency on which neighbor cell measurement is taken.

27. A method for wireless communications at a network entity, comprising:

transmitting signaling configuring a user equipment (UE) with a first serving cell measurement object (MO) and a second serving cell MO;

receiving a first cell measurement report from the UE according to the first serving cell MO, when operating in a first bandwidth part (BWP);

configuring the UE, via the signaling configuring the UE with the second serving cell MO, to update a neighbor cell MO after a BWP switch from the first BWP to a second BWP, wherein the update comprises updating a frequency of the neighbor cell MO to match a frequency of the second serving cell MO; and receiving a second cell measurement report from the UE according to the second serving cell MO after the BWP switch.

* * * * *